United States Patent [19]

Takagi et al.

[11] Patent Number: 5,026,761
[45] Date of Patent: Jun. 25, 1991

[54] ELASTIC PAINT COMPOSITION

[75] Inventors: Motoyuki Takagi, Higashi-Nakajima; Takuji Yoshimura, Toyonaka; Yoshihiro Yamano, Tokyo, all of Japan

[73] Assignee: National Starch and Chemical Investment Holding Corporation, Wilmington, Del.

[21] Appl. No.: 388,092

[22] Filed: Aug. 1, 1989

[30] Foreign Application Priority Data

Aug. 19, 1988 [JP] Japan .................................. 63-205015

[51] Int. Cl.$^5$ ................................................ C09D 4/02
[52] U.S. Cl. ..................................................... 524/460
[58] Field of Search ......................................... 524/460

[56] References Cited

FOREIGN PATENT DOCUMENTS 59-193968 11/1984 Japan .

Primary Examiner—Joseph L. Schofer
Assistant Examiner—Jeffrey T. Smith
Attorney, Agent, or Firm—Eugene Zagarella, Jr.; Edwin M. Szala

[57] ABSTRACT

The present invention relates to an elastic paint composition, having a substantially uniform mixture comprising:

(A) a water-based polymer emulsion; containing at least one monomer selected from the group consisting of acrylic esters and methacrylic esters having a glass transition temperature of 30° to −60° C., and (B) (1) a reactive compound dissolved in an organic solvent, selected from the group consisting of a compound having at least three methacryloyl radicals and a molecular weight of at least 200 that becomes hardened by the reaction of their methacryloyl radicals with ultraviolet rays, and (2) a compound having at least one double bond and a molecular weight of at least 300 that becomes hardened by the oxidation reaction at the double bond, wherein the amount of said organic solvent is in the range of 5 to 50 percent, based on the weight of water in said mixture.

3 Claims, No Drawings

ELASTIC PAINT COMPOSITION

BACKGROUND OF THE INVENTION

This invention relates to an elastic paint composition. More particularly, the present novel composition is applied to substrates such as the exterior surfaces of buildings, wherein the outer surface of the paint coating hardens by photo-reaction with ultraviolet rays or by oxidation with air, while the under-surface of the paint coating retains enough elasticity (flowability) to cover any cracks which are present or may develop on the substrate, which contributes to maintaining a good appearance.

The elastic paint composition of this invention may include conventional additives mixed in to the paint compositions, such as inorganic fillers, thickeners, dispersing agents, colorants, defoamants, preservatives, fungicides, and the like.

The exterior surfaces such as roofs and walls of buildings are mainly coated with water-proofing paint in order to prevent water from leaking through cracks that may occur or widen on the substrate. These water-proofing paints are composed mainly of elastomers, such as chloroprene, urethane, or acrylic rubbers, which are used to cover newly developed cracks on concrete substrates. Acrylic rubbers are preferred due to their superior weather-resistance properties. Preferably, the elastomers having a low glass transition temperature (Tg) are used because their elasticity is hardly affected over a wide range of ambient temperatures. Unfortunately, these paints tend to be sticky (tacky), and dust particles in the air tend to cling to their surface, thereby eventually spoiling their initial good appearance.

In order to keep a good appearance on the coated surfaces for a long period of time, the paints have to (a) be soil-resistance, (b) retain luster on their surface, and (c) avoid discoloration as much as possible. There have been various attempts to incorporate these desirable properties into paints, but each of them has its own disadvantages. The prior art discloses a method of coating an elastomer-based paint with a hardenable resin-based paint in order to prevent the soiling of the surface. This method comprises applying an elastomeric paint, having a Tg of $-20°$ C., on an area previously coated with a primer. The paint is applied at a rate of about 1 kg/m$^2$ and allowed to dry for up to one day. After the paint has dried, a hardenable resin is applied having a Tg of at least 0° C. Alternatively, a rubber-based (less sticky) resin may be applied on the elastomeric paint at a rate of 0.2 kg/m$^2$. However, the overcasting cannot follow the elasticity of the undercoating. As a result there frequently appears cracks in the overcoating which will also cause the undercoating to crack. This method of double coating is both time-and labor consuming.

Japanese patent application laid-open publication No. Sho 59-193968 discloses a method for preventing applied paint from soiling, by applying a mixture of an acrylic type oligomer with an acryloyl or methacryloyl radical and a soft acrylate-based resin dissolved in an organic solvent as a coating which is used for 10 days under standard conditions. The problem with this method is that the surface of the mixture does not harden as well as expected. The resin is so uniformly mixed with the oligomer that it is difficult to harden only the surface. This kind of mixed paint is inferior in luster-retainability and becomes soiled comparatively easily.

The prior art also discloses a method for preventing an applied paint from soiling by applying a soft resin-based paint mixed with an oxidation-hardenable oligomer and allowing the mixture to harden in the air. This method has a similar problem to the method disclosed in Japanese Patent application Publication No. 59-193968, because the paint is too uniformly-mixed with the oligomer to form a hard crust thereon.

Accordingly, it is an object of this invention to provide a paint composition coating that retains its luster and soil-resistance on its hard upper surface, and also retains the flowability or flexibility of the under-surface of the paint coating which covers cracks which may develop or are present on the substrate.

SUMMARY OF THE INVENTION

This invention relates to an elastic paint composition having a substantially uniform mixture comprising:

(A) a water-based polymer or copolymer emulsion composed mainly of at least one monomer selected from the group consisting of acrylic esters and methacrylic esters having a glass transition temperature of about 30° to $-60°$ C.; and (B) a reactive compound dissolved in an organic solvent selected from the group consisting of (1) a ray-hardenable compound having at least three methacryloyl radicals and a molecular weight of at least 200 that becomes hardened by the reaction of the methacryloyl radicals with ultraviolet rays, and (2) an oxidation-hardenable compound having at least one double bond and a molecular weight of at least 300 that becomes hardened by the oxidation reaction at the double bond, wherein the amount of said organic solvent is within the range of about 5 to 50 percent, based on the weight of water in said mixture.

DETAILED DESCRIPTION

The present inventors made intensive studies to eliminate drawbacks in the prior art methods, and finally accomplished this purpose by inventing a composition comprising a specific water-based polymer emulsion and an ultraviolet ray oligomer or an oxidation-hardenable oligomer, which is dissolved in an organic solvent in an amount from 5 to 50 percent based on the water content in the polymer emulsion. The oligomer tends to aggregate near the surface of the composition by itself, along with the evaporation of the organic solvent and hardens by the action of ultraviolet rays or oxygen in the air. Thus, the surface of the coating is provided with superior luster-retainability, soil-resistance, and discoloration-resistance, while the inner water-based polymer emulsion retains its proper softness to enable the under-surface of the paint coating to cover cracks that are present or may develop.

The water-based polymer emulsion includes polymers or copolymers composed mainly of acrylic or methacrylic esters (hereinafter referred to as methacrylic esters) having a Tg of 30° to $-60°$ C., defined by the following structure:

$$CH_2=C-COOR_2$$

wherein, $R_1$ is hydrogen or methyl; and $R_2$ is alkyl, cycloalkyl, or benzyl with 1 to 18 carbon atoms.

Typical methacrylic esters useful in the present invention include acrylic or methacrylic methylester, ethylester, propylester, amylester, hexylester, 2-ethylhexylester, n-ocylester, decylester, laurylester, cetylester, myristylester, stearylester, cyclohexylester, benzylester, and the like.

Typical copolymers useful in the present invention include copolymers composed of at least one methacrylic ester and at least one ethylenically unsaturated monomer polymerizable therewith, having a Tg of 30° to $-60°$ C.

Typical ethylenically unsaturated monomers useful in the practice of the present invention include vinyl esters, such as vinyl acetate, vinyl propionate, vinyl stearate, vinyl versatate, and the like; styrene-based monomers such as styrene, alpha-methylstyrene, and the like; nitrilic monomers such as acrylonitrile, methacrylonitrile, and the like; acid monomers such as acrylic acid, methacrylic acid, crotonic acid, itaconic acid, maleic acid, monoalkylmaleate, monomaleate of hydroxyethyl(propyl)acrylate, monofumarate, and the like; monomers containing a hydroxy radical such as 2-hydroxyester or 2-hydroxypropylester of methacrylic acid, monomethacrylate of polyethyleneglycol or polypropyleneglycol, and the like; monomers containing amide or N-methylol radicals such as methacrylamdide, methylolmethacrylamide, methyl-ene-bis-acrylamide, diacetoamide, and the like; cross-linkable monomers such as vinyl silane, diacrylphthalate, cyclopentadiene, diarylfumarate, ethyleneglycoldimethacrylate, trimethylolpropanetrimethacrylate, dimethylaminoethylmethacrylamide, inorganic salts of epichlorhydrin additives, inorganic acid salts of dimethlaminopropylmethacrylamdie epichlorhydrin additives, and the like.

Typical copylymers used in the present invention include 2-ethylhexylacrylate (2EHA)-acrylonitrile (AN)-acrylic acid (AA) copolymer, butylacrylate (BA)-AN-AA copolymer, 2EHA-AN-methacylic acid (MAA) copolymer, BA-AN-MAA copolymer, 2-EHA-methylmethacrylate (MMA)-AA copolymer, BA-MMA-AA copolymer, 2-EHA-MMA-MAA copolymer, BA-MMA-MAA copolymer, 2-EHA-styrene (St)-AA copolymer, BA-St-MAA copolymer, 2-EHA-St-AN-AA copolymer, 2-EHA-MMA-AN-AA copolymer, BA-St-AN-AA copolymer, BA-MMA-AN-AA copolymer, BA-MMA-AN-AA copolymer, divinylbenzene (DBV)-BA-MMA-AN-AA copolymer, 2EHA-MMA-AN-AA copolymer, DVB-2EHA-MMA-AN-AA copolymer, hydrochloric acid salt of dimethylaminopropylmethacrylamide epichlorhydrin additive (DMAPAEpi)-BA-MMA-AN-AA copolymer, DMAPAEpi-2EHA-MMA-AN-AA copolymer, and the like. It is preferable to use copolymers containing acid radicals.

The water-based polymer emulsion (A) contains a polymer having a Tg within the range of $-60°$ to 30° C. When the Tg is lower than $-60°$ C., the strength of the elastic paint composition is considerably decreased, which results in the loss of its ability to be water-proof. When its Tg is higher than 30° C., the paint film's flexibility to cover cracks in the substrate is significantly diminished, as well as its ability to be water-proof.

The water-based polymer emulsion can be produced by any well-known emulsion polymerization process. Thus, it may contain the conventional anionic-type, cationic type or amphoteric-type surface active agents. It may also contain conventional additives, such as protective colloids (water-soluble polymers), if necessary.

Typical ultraviolet ray-hardenable oligomeric compounds having at least three methacryloyl radicals and a molecular weight of at least 200 used in present novel paint composition include:

(A) polyumethacrylates having a 2 to 6 valence, aliphatic, alicyclic, or aromatic poly-alcohols, and polyalkyleneglycols (disclosed in Japanese patent application, laid-open publication No. sho 49-12098), such as polymethacrylates of ethyleneglycol, propyleneglycol, butane diol, hexane diol, cyclohexane diol, trimethylolethane, trimethylolpropane, glycerin, sorbitol, pentaerythritol, diethyleneglycol, triethyleneglycol, polyethyleneglycol, dipropyleneglycol, polypropyleneglycol, and the like.);

(B) polyesterpolymethacrylates, (Japanese patent application laid-open publication No. Sho 49-12894) such as dimethacrylates of polyesterdiols composed of: succinic acid and ethyleneglycol, maleic acid and ethyleneglycol, phthalic acid and idethyleneglycol, tetrahydrophthalic acid and diethyleneglycol, adipic acid and triethyleneglycol; and polymethacrylates of polyesterpolyols composed of tetrahydrophthalic acid and trimethylolpropane, tetrahydrophthalic acid and pentaerithritol.

The ultraviolet ray-hardenable oligomeric compounds may be either one or a mixture composed of more than one kind of the polymethacrylates and the polyesterpolymethacrylate listed in (A) and (B).

The oxidation-hardenable oligomeric compounds having at least one double bond and a molecular weight of at least 300 used int he present paint composition includes well-known oxidation hardenable resins. The double bond is represented by any conjugate or non-conjugate carbon-carbon double bond used in drying or semi-drying oils, and 1,4-cis, 1,4-trans, and 1,2-vinyl structured double bonds high in polybutadiene. Compounds with these kinds of double bonds include:

(A) polydiene; a homopolymer built up from $C_4$–$C_8$ diene compounds such as polybutadiene, polypentadiene, and polyisoprene, and a copolymer thereof. Outstanding copolymerizable monomers include: styrene, vinyltoulene, methacrylonitrile, methacrylonitrile, methacrylic ester and the like;

(B) Aliphatic acid-denatured alkyd, more particularly, alkyd denatured by aliphatic acids of drying or semi-drying oils. Examples: aliphatic acids such as linseed oil, sesame oil, tung oil, castor oil, and the like; polyalcohols for the polyester such as ethyleneglycol, propyleneglycol, diethyleneglycol, glycerine, trimethylolethane, pentaerithritol and the like; carboxylic acids for the polyester such as phthalic acid, isophthalic acid, terephthalic acid, tetrahydrophthalic acid, succinic acid, adipic acid and the like. (The polyesters are obtained from the condensation reaction of the polyalcohol and carboxylic acid.);

(C) Special kinds of polydienes: alicyclic compound copolymers such as denatured-dicyclopentadiene (Japanese patent application laid-open publication No. Sho 56-38302), denatured 3,6-endomethylene-4-tetrahydrophthalic acid anhydride (Japanese patent application laid-open publication No. Sho 56-136802), denatured dicyclopentenylacrylate and the like.

The oxidation-hardenable oligomeric compounds of this invention includes one or a mixture composed of more than one kind of compound listed in (A), (B), and (C).

The organic solvent used for the ultraviolet ray-hardenable or the oxidation-hardenable compound must be capable of dissolving the ultraviolet ray-hardenable or oxidation-hardenable oligomers described above. It should also have a poor affinity with the water-based polymer emulsion. It should desirably be composed of mainly aromatic hydrocarbons and have a solubility parameter (SP) of 9 or less. These kinds of hydrocarbons improve the properties of the elastic paint of this invention. For this purpose, benzene, toluene, o-xylene, m-xylene, p-xylene, ethylbenzene, 1,3,5-trimethyl-5-ethylbenzene, 1,2,3,5-tetramethylbenzene, 1,4-dimethyl2-ethylbenzene, 1,2-dimethyl-4-ethylbenzene, and the like are desirable. These hydrocarbons are uses singly or in combination as a mixture.

The elastic paint composition of the invention is made with a water-based polymer emulsion (A) and a reactive hardening compound (B) dissolved in an organic solvent, provided that the amount of the organic solvent is in the range of 5 to 50 percent by weight, based on the weight of the water content in the composition (the water-based polymer emulsion). When the amount of solvent is less than 5 percent by weight based on the weight of the water, the soil-resistance and the luster-retainability of the composite paint tent to decrease by weathering. When the solvent is more than 50 percent by weight based on the weight of the water, the luster and the soil-resistance of the composite paint is also diminished.

It is desirable that the amount of reactive compound B (hardenable oligomeric compound is in the range of 2 to 40 percent by weight based on the weight of the solid component in the water-based polymer emulsion. When it is less than 2 percent by weight, the soil-resistance and the luster-retainability of the paint composition tends to decrease. When it is more than 40 percent by weight, the weather-resistance of the paint composition deteriorates.

The present novel elastic water paint composition of this invention can be used with or without conventional additives. A variety of additives conventionally incorporated in water emulsion type paints can be used in the elastic paint of the present invention. Examples thereof include thickeners such as methylcellulose, carboxymethylcellulose, polyvinylalcohol, polyacrylates, polyvinylpyroridone and the like; phosphates such as potassium, sodium, or ammonium salts of condensed phosphoric acid, such as pyrophosphoric acid, tripolyphosphoric acid, hexamethaphosphoric acid, and the like; dispersing agents such as anionic and nonionic surfactants; inorganic fillers such as titanium oxide, heavy calcium carbonate, kaolin, diatomaceous earth, and talc; and other additives such as coloring pigments, defoamers, preservatives, and antiseptics.

In order to explain this invention in more detail, examples and comparative examples will be given hereinafter. Unless otherwise described, the words part and percent mean part by weight and percent by weight, respectively.

The procedures used for preparing samples, tests, and determinations of the properties of paint films contemplated by this invention and comparative prior art paint films include:

(1) Stress-strain test for paint films
(a) Preparation of samples (1) Stress Test The stress strain test JIS-A6021 was followed. Composition samples were casted in a frame so that their film thickness was 1 mm after drying. They were left standing for 168 hours (7 days). After being taken off the frame, they were left standing for another 72 hours.

(a) Preparation of Samples

Paint film samples for the stress-strain test were prepared by punching the film with a No. 3 dumbbell as specified in JIS-K6301.

(b) Tests Performed

The tests were performed in accordance with JIS-A6021. The paint film samples were clamped with a pair of jaws of a tensile tester put in a thermostat whose temperature was adjustable to between $-20°$ and $+30°$ C. Their breaking strength and elongation were measured at $-20°$ C. with the drawing speed and the distance between the jaws being maintained at 200 mm/minute and 60 mm respectively.

(2) Tests To Determine The Flowability (Flexibility) of Paint Films (to the change of cracks thereunder)

Adeca chlorinated rubber CR-10, a product of Asahi Denka Kogyo Kabushiki Kaisha, was applied as a primer on a slate plate at a rate of 100 g/m$^2$. After 3 hours, the primer was coated with paint samples so that the overcoat was about 1 mm in thickness. It was left standing for 168 hours under standard conditions, and then exposed to ultraviolet ray irradiation for 168 hours by means of Toshiba bactericidal lump GL-15. The irradiated samples were subjected to the test at $-10°$ C. and $+20°$ C.

A crack was formed in the center of the slate plate on which the primer and the paint sample had already been applied. The width of the crack was measured. There appeared a pin hole on the paint film while drawing the cracked slate plate at a rate of 5 mm/minute with the tensile tester used in the (1) (b) test. The test results are shown in the Tables 1 to 7.

(3) Soil-Resistance Test For Paint Films

The samples were prepared in the same manner as described in (2). All the composition samples applied on the slate plate were similarly soiled with cotton fabric treated with a mixture of vaseline and 10 percent carbon black by moving the cotton fabric back and forth, perpendicular to the sample surface. The soiled portion was covered with a watch glass and left standing for 30 minutes. It was heated at 40° C. for 24 hours and left standing for another 4 hours under standard conditions, rubbed with cotton fabric, soaked with a 5 percent soap solution, rinsed with water, and dried. The color differences (E) of the samples before and after soiling were determined by using a color-difference meter (an indicator for assessing soil-resistance)

(4) Weather-Resistance Test

The samples were prepared in the same manner as described in (2). After the samples were exposed to the light of a Sunshine Weather Meter for 250 hours, their color difference was determined and the results were used as an indicator for assessing weather resistance.

(5) Outdoor Exposure Test

The samples were prepared in the same manner as descibed in (2). These samples were left standing outdoors for one year, facing the south, at an angle of 45° to the horizontal plane. The color difference was determined by samples used before and after one year of outdoor weathering.

(6) Determination Of Luster And Luster-Retainability Of The Samples

The outdoor exposure test was determined at an angle of 60° to the horizontal plane by using a digital variable angle lustermeter (VG-10 type product of Nihon Denshoku Kogyo Kabushiki Kaisha), and compared with the luster of those before the exposure test. The luster-retainability was calculated by using the following equation:

$$L.R. (\%) = \frac{\text{Luster before exposure}}{\text{Luster after exposure}} \times 100$$

EXAMPLES 1 TO 6, AND COMPARATIVE EXAMPLES 1 TO 7

(1) Preparation Of The Copolymer Emulsion

An emulsion polymerization reactor equipped with a stirrer, thermometer, cooler, and dropping device was charged with an emulsifier-catalyser mixture consisting of 20 parts of Neopelex No. 6, an anionic-type surfactant produced by Kao Soap Co., Ltd., 40 parts of Tritron X-305, a nonionic-type surfactant produced by Rohn & Haas, 5 parts of potassium persulfate, and 1300 parts of water. The mixture was then heated to 70° C. A monomer mixture consisting of 180 parts of acrylonitrile, 1580 parts of 2-ethylhexylacrylate and 40 parts of acrylic acid, and an aqueous solution of polymerization catalyser consisting of 5 parts of potassium persulfate and 200 parts of water were added dropwise. separately. The polymerization reaction was conducted at 70° C. for 2 hours. The resulting copolymer emulsion had a Tg of −56° C., and a ratio of solid component to water of 55 to 45.

(2) Preparation Of The Compositions For Elastic Paint

The compositions for elastic paint were prepared by adding: (A) 100 parts of the copolymer emulsion mixture composed of trimethylolpropanetriacrylate and tetrahydrophthalic trimethylolpropanepolyester.-polyolacrylate, an ultraviolet-ray hardenable oligomer mixture produced under the product name Aronix M 8060 by Towa Gosei Kabushiki Kaisha (hereinafter abbreviated as M 8060), and (B) a mixture with an SP value of 8.7 composed of 1.3.5.-trimethyl-5-ethylbenzene, 1,2,35- tetramethylbenzene, 1,4-dimethyl-2-ethylbenzene, and 1,2-dimethyl-4-ethylbenzene, an organic solvent mixture produced under the product name Shellsol AB by Shell Chemicals (hereinafter abbreviated as Shellsol AB). A and B are mixed with one another to prepare the present novel compositions for elastic paint.

(3) Preparation Of The Elastic Paints

The elastic paints are prepared by adding to each of the compositions about 0.6 parts of Primer 850, a dispersing agent produced by Rohm & Haas, 1.0 part of a 10 percent sodium tripolyphosphate solution, and 25 parts of titanium oxide, under violent agitation to prepare the elastic paints of Examples 1 to 6, and Comparative Examples 1 to 7. The properties of the elastic paint films, measured in accordance with the aforementioned tests are given in Tables 1 and 2.

The amount of the organic solvent (Shellsol AB) in the composition is preferably in the range of 5 to 50 percent. More preferably the organic solvent is in the range of 20 to 50 percent, based on the weight of the water. When it is less than 5 percent, the soil-resistance and the luster-retainability of these paints remarkably decrease. When it is more than 50 percent, the oil-resistance and the luster decline. (See Examples 1, 2, 4, and 6, and Comparative Examples 2, 3, and 7 and Tables 1 and 2.)

The amount of the ultraviolet ray hardenable oligomer in the composition is preferably in the range of 2 to 40 percent, based on the solid weight of the polymer emulsion. When it is less than 2 percent on that basis, the soil-resistance and the luster-retainability of the paints remarkably decline. When it is more than 40 percent, the stability of the paints become inferior. (See Examples 3 to 5, and Comparative Examples 4 to 6 and Tables 1 and 2.)

EXAMPLES 7 TO 12 AND COMPARATIVE EXAMPLES 8 TO 14

Production Of Copolymer Emulsion

An emulsifier-catalyser mixture consisting of 40 parts of Neopelex No. 6, 40 parts of Triton X-305, 5 parts of potassium persulfate, and 1300 parts of water is put in the polymerization reactor. Then, a monomer mixture consisting of 300 parts of styrene, 1460 parts of 2-ethylhexylacrylate, and 40 parts of acrylic acid, and an aqueous solution of polymerization catalyser consisting of 5 parts of potassium persulfate, and 200 parts of water are added to the polymerization reactor. All other conditions are kept the same as those in Examples 1 to 6 and Comparative Examples 1 to 7. The emulsion polymerization reaction results in a copolymer emulsion having a Tg of −49° C. and a ratio of solid component to water of 55 to 45.

Prepartion of A Composition For Elastic Paint

M8060 and Shellsol AB are added to 100 parts of a copolymer emulsion to give a uniform composition, having the ratios shown in Tables 3 and 4. The composition is used here in place of the elastic paint.

The properties of the applied composition films, measured in accordance with the aforementioned tests, are given in Tables 3 and 4.

The amount of organic solvent in the composition should be in the range of 5 to 50 percent, and preferably in the range of 20 to 50 percent, based on the weight of water. When it is less than 5 percent on that basis, the soil-resistance and the luster-retainability of the applied composition films remarkably decline, when it is more than 50 percent on that basis, the luster and soil-resistance decline. (See Examples 7012, and Comparative Examples 9, 10, and 14 and Tables 3 and 4.)

The amount of ultraviolet ray hardenable oligomer should be 2 to 40 percent, based on the weight of the solid component of the copolymer emulsion. When it is less than 2 percent on that basis, the soil-resistance and luster-retainability of the applied composition films remarkably decline. When it is more than 40 percent on that basis, their stability becomes inferior. (See Examples 9 to 11, and Comparative Examples 11 to 13 and Tables 3 and 4.)

The influence of the ratio among each component in the compositions on the properties of their applied films is similar to that in Examples 1 to 6 and Comparative Examples 1 to 7 in both the action and the effect.

EXAMPLES 13 TO 18 AND COMPARATIVE EXAMPLES 15 TO 20

Production of dicyclopentenylacrylate (DCPA), an oxidation-hardenable resin.

The polymerization reactor used in Examples 1 to 6 and Comparative Examples 1 to 7 was charged with 1000 parts of toluene with an SP value of 9.1, 400 parts of methylmethacrylate, 200 parts of butylacrylate, 100 parts of dicyclopentenylacrylate, 4 parts of azobisisobutylnitrile, and 10 parts of dodecylmercaptan. They were copolymerized at 80° C. for 6 hours and DCPA appeared in the toluene.

Preparation Of Compositions For Elastic Paints

Compositions for elastic paints were prepared by oxidizing hardenable resin DCPA dissolved in toluene and adding it to 100 parts of the copolymer emulsion produced in Examples 1 to 6 and Comparative Examples 1 to 7, having the ratios disclosed in Tables 5 and 6.

Elastic paints were prepared by adding to 100 parts of each of the compositions, 0.6 parts of Primer 850, a dispersing agent, 1.0 part of a 10 percent sodium tripolyphosphate aqueous solution, and 25 parts of titanium oxide, uniformly.

The properties of the elastic paint films were studied according to the aforementioned test procedures. Their results are shown in Tables 5 and 6.

The preparation of the elastic paint film samples used in the crack-flowability test, soil-resistance test, weather resistance test, outdoor exposure test, and the determination of luster and luster-retainability test were made as follows: Adeca chlorinated rubber CR-10, a product of Asahi Denka Kogyo Kabushi Kaisha, was applied as a primer on a slate plate at a rate of 100 g/m². After 3 hours, the primer was coated with the elastic paint (about 1 mm thick) and left standing for 504 hours under standard conditions before the testing.

It is apparent from an examination of Tables 5 and 6, that the organic solvent (for example toluene) should be in the range of 5 to 50 percent, and preferably in the range of 20 to 50 percent, based on the weight of water present in the elastic paint composition. When it is less than 5 percent, the soil-resistance and luster-retainability of the paint films remarkably decline. When it is more than 50 percent, their luster and soil-resistance declines. (See Examples 13 to 18, and Comparative Examples 15, 16, and 20 and Tables 5 and 6.)

The amount of oxidation-hardenable compound is preferably in the range of 2 to 40 percent, based on the weight of solid component in the polymer emulsion. When it is less than 2 percent, the soil-resistance and luster-retainability of the paints remarkably declines. When the oxidation-hardenable compound is more than 40 percent, its stability decreases. (See Examples 15 to 17, and Comparative Examples 17 to 19 and Tables 5 and 6.)

In Tables 5 and 6, the term DCPA residue means solid DCPA which remains after toluene is removed by an evaporator.

COMPARATIVE EXAMPLES 21 AND 22

A solution composed of 11 parts of M 8060 and 18 parts of methanol with an SP value 14.5/ 18 parts of chloroform with an SP value of 9.3 was added to 100 parts of the copolymer emulsion produced in Examples 1 to 6 and Comparative Examples 1 to 7. The composition was used here as is, in place of the elastic paint. Other conditions were kept unchanged. The results are shown in Table 7.

It is apparent from an examination of Table 7 and the results obtained in Example 3, that when the solubility parameter of an organic solvent to dissolve ultraviolet ray hardenable oligomers is greater than 9.0 (in other words, when the hydrophilicity of the organic solvent is superior), the soil-resistance and the luster-retainability of the paint is inferior.

The composition for elastic paint of this invention, also includes the composition mixed with conventional additives for water-paint, such as fillers and dispersants. Only its surface becomes hardened by the action of ultraviolet rays or oxidation, while the interior retains the proper mechanical properties to flow and cover the formation and development of cracks in the substrate. The composition, therefore, has good soil-resistance and luster-retainability, extending over a long period of time.

TABLE 1

| Additives (part) | Ex. 1 | Ex. 2 | Ex. 3 | Ex. 4 | Ex. 5 | Ex. 6 |
| --- | --- | --- | --- | --- | --- | --- |
| M 8060 | 11 | 11 | 1.1 | 11 | 22 | 11 |
| Shellsol AB | 25 | 9 | 18 | 18 | 18 | 22.5 |
| Ratio (%) | | | | | | |
| M 8060/Shellsol AB | 489 | 122 | 6 | 61 | 122 | 49 |
| Shellsol AB/water | 5 | 20 | 40 | 40 | 40 | 50 |
| M 8060/Emulsion solid component | 20 | 20 | 2 | 20 | 40 | 20 |
| Paint film properties | | | | | | |
| Strength at +20° C. (kg/cm²) | 15 | 14 | 11 | 15 | 18 | 19 |
| Strength at −20° C. (kg/cm²) | 36 | 34 | 25 | 33 | 40 | 41 |
| Elongation at +20° C. (%) | 700 | 690 | 750 | 680 | 560 | 550 |
| Elongation at −20° C. (%) | 250 | 250 | 300 | 200 | 150 | 150 |
| Crack-followability at +20° C. (mm) | 8 | 8 | 10 | 8 | 6 | 6 |
| Crack-followability at −10° C. (mm) | 3 | 4 | 5 | 3 | 2 | 2 |
| Soil-resistance (ΔE) | 4.9 | 2.7 | 3.4 | 2.8 | 2.1 | 1.9 |
| Weather-resistance (ΔE) | 3.0 | 3.1 | 3.2 | 3.0 | 3.0 | 2.8 |
| Outdoor Exposure test (ΔE) | 5.7 | 4.4 | 4.7 | 4.3 | 3.8 | 3.5 |
| Luster before exposure (%) | 61 | 60 | 58 | 61 | 74 | 75 |
| Luster after exposure (%) | 37 | 40 | 42 | 44 | 60 | 60 |
| Luster-retainability (%) | 61 | 67 | 72 | 72 | 81 | 80 |

TABLE 2

| Additives (part) | C. Ex. 1 | C. Ex. 2 | C. Ex. 3 | C. Ex. 4 | C. Ex. 5 | C. Ex. 6* | C. Ex. 7 |
|---|---|---|---|---|---|---|---|
| M 8060 | 0 | 11 | 11 | 0 | 0.55 | 44 | 11 |
| Shellsol AB | 0 | 0 | 1.35 | 18 | 18 | 18 | 36 |
| Ratio (%) | | | | | | | |
| M 8060/Shellsol AB | — | — | 815 | 0 | 31 | 24 | 31 |
| Shellsol AB/water | 0 | 0 | 3 | 40 | 40 | 40 | 80 |
| M 8060/Emulsion solid component | 0 | 20 | 20 | 0 | 1 | 80 | 20 |
| Paint film properties | | | | | | | |
| Strength at +20° C. (kg/cm$^2$) | 8 | 15 | 16 | 7 | 8 | | 5 |
| Strength at −20° C. (kg/cm$^2$) | 21 | 30 | 29 | 19 | 21 | | 30 |
| Elongation at +20° C. (%) | 800 | 750 | 750 | 820 | 800 | | 950 |
| Elongation at −20° C. (%) | 340 | 240 | 210 | 340 | 300 | | 300 |
| Crack-followability at +20° C. (mm) | 12 | 10 | 10 | 12 | 10 | | 15 |
| Crack-followability at −10° C. (mm) | 5 | 5 | 5 | 5 | 4 | | 4 |
| Soil-resistance (ΔE) | 14.9 | 8.8 | 7.9 | 15.4 | 13.6 | | 10.4 |
| Weather-resistance (ΔE) | 3.5 | 3.6 | 3.4 | 3.7 | 3.6 | | 3.8 |
| Outdoor Exposure test (ΔE) | 15.1 | 10.2 | 9.8 | 16.3 | 14.1 | | 10.2 |
| Luster before exposure (%) | 60 | 59 | 58 | 57 | 57 | | 48 |
| Luster after exposure (%) | 20 | 21 | 29 | 17 | 18 | | 21 |
| Luster-retainability (%) | 33 | 36 | 50 | 30 | 32 | | 44 |

*In comparative example 6, the gellation made it impossible to carry out the test.

TABLE 3

| Additives (part) | Ex. 7 | Ex. 8 | Ex. 9 | Ex. 10 | Ex. 11 | Ex. 12 |
|---|---|---|---|---|---|---|
| M 8060 | 11 | 11 | 1.1 | 11 | 22 | 11 |
| Shellsol AB | 2.25 | 9 | 18 | 18 | 18 | 22.5 |
| Ratio (%) | | | | | | |
| M 8060/Shellsol AB | 489 | 122 | 6 | 61 | 122 | 49 |
| Shellsol AB/water | 5 | 20 | 40 | 40 | 40 | 50 |
| M 8060/Emulsion solid component | 20 | 20 | 2 | 20 | 40 | 20 |
| Paint film properties | | | | | | |
| Strength at +20° C. (kg/cm$^2$) | 23 | 21 | 20 | 26 | 30 | 32 |
| Strength at −20° C. (kg/cm$^2$) | 53 | 52 | 47 | 52 | 58 | 61 |
| Elongation at +20° C. (%) | 750 | 720 | 800 | 700 | 650 | 650 |
| Elongation at −20° C. (%) | 200 | 200 | 240 | 150 | 120 | 120 |
| Crack-followability at +20° C. (mm) | 7 | 6 | 8 | 6 | 5 | 5 |
| Crack-followability at −10° C. (mm) | 3 | 3 | 4 | 3 | 2 | 2 |
| Soil-resistance (ΔE) | 4.3 | 2.6 | 3.2 | 3.0 | 2.9 | 2.8 |
| Weather-resistance (ΔE) | 6.3 | 5.1 | 5.8 | 4.9 | 5.0 | 5.0 |
| Outdoor Exposure test (ΔE) | 5.9 | 4.9 | 5.1 | 4.8 | 4.4 | 4.5 |
| Luster before exposure (%) | 64 | 61 | 60 | 66 | 70 | 75 |
| Luster after exposure (%) | 39 | 41 | 44 | 48 | 58 | 61 |
| Luster-retainability (%) | 61 | 67 | 73 | 73 | 83 | 81 |

TABLE 4

| Additives (part) | C. Ex. 8 | C. Ex. 9 | C. Ex. 10 | C. Ex. 11 | C. Ex. 12 | C. Ex. 13* | C. Ex. 14 |
|---|---|---|---|---|---|---|---|
| M 8060 | 0 | 11 | 11 | 0 | 0.55 | 44 | 11 |
| Shellsol AB | 0 | 0 | 1.35 | 18 | 18 | 18 | 36 |
| Ratio (%) | | | | | | | |
| M 8060/Shellsol AB | — | — | 815 | 0 | 31 | 24 | 31 |
| Shellsol AB/water | 0 | 0 | 3 | 40 | 40 | 40 | 80 |
| M 8060/Emulsion solid component | 0 | 20 | 20 | 0 | 1 | 80 | 20 |
| Paint film properties | | | | | | | |
| Strength at +20° C. (kg/cm$^2$) | 13 | 18 | 17 | 12 | 15 | | 10 |
| Strength at −20° C. (kg/cm$^2$) | 32 | 47 | 46 | 31 | 39 | | 34 |
| Elongation at +20° C. (%) | 820 | 770 | 790 | 850 | 800 | | 880 |
| Elongation at −20° C. (%) | 180 | 190 | 180 | 190 | 170 | | 160 |
| Crack-followability at +20° C. (mm) | 7 | 7 | 7 | 8 | 7 | | 8 |
| Crack-followability at −10° C. (mm) | 3 | 3 | 3 | 3 | 3 | | 4 |
| Soil-resistance (ΔE) | 13.0 | 10.1 | 10.4 | 13.5 | 10.0 | | 8.9 |
| Weather-resistance (ΔE) | 7.1 | 6.4 | 6.3 | 7.0 | 6.4 | | 6.5 |
| Outdoor Exposure test (ΔE) | 14.7 | 11.6 | 11.1 | 14.8 | 13.9 | | 10 |
| Luster before exposure (%) | 65 | 65 | 64 | 65 | 64 | | 50 |
| Luster after exposure (%) | 18 | 23 | 24 | 19 | 22 | | 24 |
| Luster-retainability (%) | 28 | 35 | 38 | 29 | 34 | | 48 |

*In comparative example 13, the gellation made it impossible to carry out the tests.

TABLE 5

| Additives (part) | Ex. 13 | Ex. 14 | Ex. 15* | Ex. 16* | Ex. 17 | Ex. 18* |
|---|---|---|---|---|---|---|
| DCPA toluene solution | 0 | 0 | 2.75 | 27.5 | 0 | 27.5 |
| DCPA residue | 11 | 11 | 0 | 0 | 22 | 0 |
| Toluene | 2.25 | 9 | 16.35 | 1.5 | 18 | 6 |
| Ratio (%) | | | | | | |

TABLE 5-continued

| Additives (part) | Ex. 13 | Ex. 14 | Ex. 15* | Ex. 16* | Ex. 17 | Ex. 18* |
|---|---|---|---|---|---|---|
| DCPA/toluene | 489 | 122 | 6 | 61 | 122 | 49 |
| Toluene/water | 5 | 20 | 40 | 40 | 40 | 50 |
| DCPA/Emulsion solid component | 20 | 20 | 2 | 20 | 40 | 20 |
| Paint film properties | | | | | | |
| Strength at +20° C. (kg/cm$^2$) | 20 | 18 | 16 | 18 | 23 | 24 |
| Strength at −20° C. (kg/cm$^2$) | 42 | 40 | 38 | 40 | 45 | 45 |
| Elongation at +20° C. (%) | 650 | 610 | 670 | 640 | 600 | 590 |
| Elongation at −20° C. (%) | 190 | 190 | 210 | 170 | 150 | 150 |
| Crack-followability at +20° C. (mm) | 7 | 7 | 8 | 7 | 6 | 6 |
| Crack-followability at −10° C. (mm) | 3 | 3 | 4 | 3 | 2 | 3 |
| Soil-resistance (ΔE) | 3.7 | 2.4 | 2.9 | 2.5 | 2.0 | 2.0 |
| Weather-resistance (ΔE) | 4.2 | 4.1 | 4.0 | 4.1 | 4.3 | 4.2 |
| Outdoor Exposure test (ΔE) | 5.5 | 4.4 | 4.8 | 4.6 | 4.0 | 4.0 |
| Luster before exposure (%) | 54 | 54 | 53 | 55 | 59 | 60 |
| Luster after exposure (%) | 30 | 29 | 30 | 31 | 45 | 44 |
| Luster-retainability (%) | 56 | 54 | 57 | 56 | 76 | 73 |

*In examples 15, 16, and 18, DCPA toluene solution contains 1.1% of DCPA solid.

TABLE 6

| Additives (part) | C. Ex. 15 | C. Ex. 16 | C. Ex. 17 | C. Ex. 18* | C. Ex. 19* | C. Ex. 20* |
|---|---|---|---|---|---|---|
| DCPA toluene solution | 0 | 0 | 0 | 1.38 | 0 | 27.5 |
| DCPA residue | 11 | 11 | 0 | 0 | 44 | 0 |
| Toluene | 0 | 1.35 | 18 | 17.17 | 18 | 19.5 |
| Ratio (%) | | | | | | |
| DCPA/toluene | — | 815 | 0 | 31 | 24 | 31 |
| Toluene/water | 0 | 3 | 40 | 40 | 40 | 80 |
| DCPA/Emulsion solid component | 20 | 20 | 0 | 1 | 80 | 20 |
| Paint film properties | | | | | | |
| Strength at +20° C. (kg/cm$^2$) | 16 | 17 | 7 | 9 | | 9 |
| Strength at −20° C. (kg/cm$^2$) | 40 | 39 | 20 | 22 | | 32 |
| Elongation at +20° C. (%) | 630 | 640 | 830 | 810 | | 850 |
| Elongation at −20° C. (%) | 180 | 170 | 340 | 290 | | 300 |
| Crack-followability at +20° C. (mm) | 8 | 8 | 12 | 10 | | 11 |
| Crack-followability at −10° C. (mm) | 4 | 3 | 5 | 5 | | 4 |
| Soil-resistance (ΔE) | 8.2 | 8.1 | 15.4 | 13.3 | | 10.5 |
| Weather-resistance (ΔE) | 4.3 | 4.2 | 3.6 | 3.9 | | 5.0 |
| Outdoor Exposure test (ΔE) | 14.4 | 13.9 | 16.0 | 15.0 | | 14.7 |
| Luster before exposure (%) | 53 | 54 | 56 | 52 | | 46 |
| Luster after exposure (%) | 19 | 19 | 16 | 16 | | 20 |
| Luster-retainability (%) | 36 | 35 | 29 | 31 | | 43 |

*In comparative examples 18 and 20, DCPA toluene solution contains 0.55% and 11% of DCPA solid respectively.
*In comparative example 19 the gelation made it impossible to carry out the tests.

TABLE 7

| Additives (part) | C. Ex. 21 | C. Ex. 22 |
|---|---|---|
| M 8060 | 11 | 11 |
| Methanol | 18 | 0 |
| Chloroform | 0 | 18 |
| Ratio (%) | | |
| M 8060/Methanol + Chloroform | 61 | 61 |
| Methanol + Chloroform/water | 40 | 40 |
| M 8060/Emulsion solid component | 20 | 20 |
| Paint film properties | | |
| Strength at +20° C. (kg/cm$^2$) | 15 | 16 |
| Strength at −20° C. (kg/cm$^2$) | 31 | 30 |
| Elongation at +20° C. (%) | 740 | 750 |
| Elongation at −20° C. (%) | 250 | 240 |
| Crack-followability at +20° C. (mm) | 10 | 10 |
| Crack-followability at −10° C. (mm) | 5 | 5 |
| Soil-resistance (ΔE) | 8.7 | 9.0 |
| Weather-resistance (ΔE) | 3.5 | 3.6 |
| Outdoor Exposure test (ΔE) | 10.0 | 9.9 |
| Luster before exposure (%) | 59 | 30 |
| Luster after exposure (%) | 21 | 10 |
| Luster-retainability (%) | 36 | 33 |

What is claimed:

1. An elastic paint composition, having a substantially uniform mixture comprising:
   (A) a water-base polymer or copolymer emulsion containing at least one monomer selected from the group consisting of acrylate esters and methacrylate esters having a glass transition temperature of 30° C. to −60° C., and
   (B) a reactive compound dissolved in an organic solvent having a poor affinity with the water-based polymer emulsion and comprising mainly of aromatic hydrocarbons having a maximum solubility parameter (SP value) of 9.0, and selected from the group consisting of (1) a ray-hardenable compound having at least three methacryloyl radicals and a molecular weight of at least 200 that becomes hardened by the reaction of their methacryloyl radicals with ultraviolet rays, and (2) an oxidation hardenable compound having at least one double bond and a molecular weight of at least 300 that becomes hardened by the oxidation reaction at the double bond, wherein the amount of said organic solvent is in the range of 5 to 50%, based on the weight of the water in said mixture.

2. An elastic paint composition, having a substantially uniform mixture comprising:
   (A) a water-base polymer or copolymer emulsion containing at least one monomer selected from the group consisting of acrylate esters and methacrylate esters having a glass transition temperature of 30° C., to −60° C., and
   (B) a reactive compound dissolved in an organic solvent having a poor affinity with the water-based polymer emulsion, selected from the group consisting of (1) a ray-hardenable compound having at least three methacryloyl radicals and a molecular weight of at least 200 that becomes hardened by the reaction of their methacryloyl radicals with ultraviolet rays, and (2) an oxidation hardenable compound having at least one double bond and a molecular weight of at least 300 that becomes hardened by the oxidation reaction at the double bond, wherein the amount of said organic solvent is in the range of 5 to 50%, based on the weight of the water in said mixture and the amount of said reactive component B is within the range of 2 to 40%, based on the weight of the polymer of said water based polymer emulsion A.

3. An elastic paint composition, having a substantially uniform mixture comprising:

(A) a water-based polymer or copolymer emulsion containing at least one monomer selected from the group consisting of acrylate esters and methacrylate esters having a glass transition temperature of 30° C., to −60° C., and (B) a reactive compound dissolved in an organic solvent having a poor affinity with the water-based polymer emulsion and comprising mainly of aromatic hydrocarbons having a maximum solubility parameter (SP value) of 9.0, and selected from the group consisting of (1) a ray-hardenable compound having at least three methacryloyl radicals and a molecular weight of at least 200 that becomes hardened by the reaction of their methacryloyl radicals with ultraviolet rays, and (2) an oxidation hardenable compound having at least one double bond and a molecular weight of at least 300 that becomes hardened by the oxidation reaction at the double bond, wherein the amount of said organic solvent is in the range of 5 to 50%, based on the weight of the water in said mixture and the amount of said reactive component B is within the range of 2 and 40%, based on the weight of the polymer of said water based polymer emulsion A.

* * * * *